US011309754B2

(12) United States Patent
Kelly

(10) Patent No.: US 11,309,754 B2
(45) Date of Patent: Apr. 19, 2022

(54) GENERATOR WITH SERIES STATORS, AND SERIES ROTORS SEPARATED BY ANNULAR COLLARS WITH COOLING VENTS

(71) Applicant: GREENSPUR RENEWABLES LIMITED, London (GB)

(72) Inventor: Hugh-Peter Granville Kelly, Westcliff on Sea (GB)

(73) Assignee: TIME TO ACT LIMITED, Hatfield (GB)

( * ) Notice: Subject to any disclaimer, the term of this patent is extended or adjusted under 35 U.S.C. 154(b) by 680 days.

(21) Appl. No.: 15/774,330

(22) PCT Filed: Nov. 9, 2016

(86) PCT No.: PCT/GB2016/053498
§ 371 (c)(1),
(2) Date: May 8, 2018

(87) PCT Pub. No.: WO2017/081458
PCT Pub. Date: May 18, 2017

(65) Prior Publication Data
US 2020/0266678 A1    Aug. 20, 2020

(30) Foreign Application Priority Data

Nov. 9, 2015  (GB) .................................... 1519743

(51) Int. Cl.
*H02K 1/27* (2006.01)
*H02K 1/2793* (2022.01)
(Continued)

(52) U.S. Cl.
CPC ............. *H02K 1/2793* (2013.01); *H02K 1/32* (2013.01); *H02K 7/1838* (2013.01); *H02K 9/06* (2013.01);
(Continued)

(58) Field of Classification Search
CPC ...... H02K 1/2793; H02K 1/32; H02K 7/1838; H02K 7/183; H02K 9/06; H02K 9/02;
(Continued)

(56) References Cited

U.S. PATENT DOCUMENTS 1,335,129 A  *  3/1920  Schroeder ................ H02K 9/14
                                                              310/57
2,138,231 A  *  11/1938  Gebhardt ............... H02K 51/00
                                                              290/17
(Continued)

FOREIGN PATENT DOCUMENTS

CN          101689775 A        3/2010
CN          102075041 A        5/2011
(Continued)

OTHER PUBLICATIONS

DE102010009486B4 English Translation.*
(Continued)

*Primary Examiner* — Maged M Almawri
(74) *Attorney, Agent, or Firm* — Quarles & Brady LLP

(57) ABSTRACT

A generator (10) comprising a series of spaced annular stators (15) sandwiched between a series of rotors (11), the rotors (11) each being separated by annular collars (16), the annular collars (16) defining a central cavity; at least one cooling gas source for supplying gas to the central cavity; vents (23,24,25,26,27,28,31,32,33,34,35) through the annular collars (16) for providing a means of egress for the cooling gas (20) from the central cavity radially outwards over the rotors (11) and the annular stators (15).

11 Claims, 5 Drawing Sheets

(51) Int. Cl.
*H02K 1/32* (2006.01)
*H02K 7/18* (2006.01)
*H02K 9/06* (2006.01)
*H02K 9/12* (2006.01)
*H02K 16/00* (2006.01)
*H02K 21/24* (2006.01)

(52) U.S. Cl.
CPC ............ *H02K 9/12* (2013.01); *H02K 16/00* (2013.01); *H02K 21/24* (2013.01)

(58) Field of Classification Search
CPC ............ H02K 9/04; H02K 9/12; H02K 21/24; H02K 16/00; H02K 16/02; H02K 16/025; H02K 16/04
USPC ..... 310/52, 54, 55, 56, 57, 58, 59, 112, 114, 310/62, 63
See application file for complete search history.

(56) References Cited

U.S. PATENT DOCUMENTS

| | | | | |
|---|---|---|---|---|
| 2,626,365 | A * | 1/1953 | Baudryrenea | H02K 3/22 310/55 |
| 3,000,322 | A * | 9/1961 | White | F04C 23/008 417/410.3 |
| 3,219,855 | A * | 11/1965 | Zimmerman | B23Q 11/127 310/57 |
| 3,225,231 | A * | 12/1965 | Kudlacik | H02K 3/24 310/64 |
| 3,303,369 | A * | 2/1967 | Erickson | H02K 19/24 310/168 |
| 3,435,263 | A * | 3/1969 | Willyoung | H02K 9/00 310/61 |
| 3,497,737 | A * | 2/1970 | Philofsky | H02K 3/22 310/54 |
| 6,204,580 | B1 * | 3/2001 | Kazmierczak | H02K 3/24 310/216.119 |
| 6,215,212 | B1 * | 4/2001 | Grennan | H02K 1/32 310/58 |
| 6,346,754 | B1 * | 2/2002 | Kieda | H02K 3/24 310/270 |
| 6,488,486 | B1 | 12/2002 | Debleser | |
| 6,700,235 | B1 * | 3/2004 | McAfee | H02K 9/06 310/52 |
| 6,703,729 | B2 * | 3/2004 | Weeber | H02K 55/04 310/52 |
| 6,882,068 | B2 * | 4/2005 | Weeber | H02K 9/12 310/59 |
| 6,930,471 | B2 * | 8/2005 | Sivasubramaniam | H02J 3/1885 322/45 |
| 7,476,994 | B2 * | 1/2009 | Birdi | H02K 1/32 310/216.016 |
| 9,024,460 | B2 * | 5/2015 | Xu | F01K 23/04 290/52 |
| 9,318,934 | B2 * | 4/2016 | Duesing | H02K 11/0094 |
| 10,404,138 | B2 * | 9/2019 | Kawashima | H02K 7/14 |
| 2002/0074873 | A1 * | 6/2002 | Jarczynski | H02K 1/32 310/61 |
| 2004/0135436 | A1 * | 7/2004 | Gilbreth | H02J 1/14 307/18 |
| 2006/0163962 | A1 * | 7/2006 | Shimada | B23Q 11/127 310/90.5 |
| 2006/0175920 | A1 * | 8/2006 | Shimada | F16C 32/0468 310/90.5 |
| 2007/0120427 | A1 * | 5/2007 | Lund | H02K 1/32 310/54 |
| 2008/0252078 | A1 * | 10/2008 | Myers | F02C 1/05 290/52 |
| 2009/0028730 | A1 * | 1/2009 | Radermacher | H02K 9/19 417/423.8 |
| 2010/0303652 | A1 | 12/2010 | Peng et al. | |
| 2011/0150637 | A1 * | 6/2011 | Radermacher | F04D 29/584 415/178 |
| 2012/0133231 | A1 * | 5/2012 | Hayakawa | H02K 21/24 310/156.37 |
| 2017/0005547 | A1 * | 1/2017 | Chou | H02K 9/28 |
| 2019/0181724 | A1 * | 6/2019 | Nakamatsu | H02K 21/16 |
| 2020/0036249 | A1 * | 1/2020 | Krais | H02K 7/003 |
| 2020/0036250 | A1 * | 1/2020 | Krais | H02K 9/19 |
| 2020/0212742 | A1 * | 7/2020 | Sridharan | H02K 1/32 |

FOREIGN PATENT DOCUMENTS

| | | |
|---|---|---|
| CN | 102612798 A | 7/2012 |
| CN | 202840876 U | 3/2013 |
| DE | 102010009486 A1 | 9/2011 |
| DE | 1020100094386 A1 | 9/2011 |
| DE | 102013104117 A1 | 11/2014 |
| EP | 2477316 A2 | 7/2012 |
| EP | 2 536 006 A1 | 12/2012 |
| EP | 2573906 A2 | 3/2013 |
| EP | 2 843 812 A2 | 3/2015 |
| EP | 2894771 A1 | 7/2015 |
| GB | 2538516 A | 11/2016 |
| JP | H08 242557 A | 9/1996 |
| JP | H10103299 A | 4/1998 |
| JP | 2005 012891 A | 1/2005 |
| JP | 2005224084 A | 8/2005 |
| WO | 2010097837 A1 | 9/2010 |
| WO | 2014/090580 A1 | 6/2014 |

OTHER PUBLICATIONS

JP2005012891A English Translation.*
International Search Report and Written Opinion under dated Jan. 31, 2017 in connection with PCT/NL2016/053498.
Search Report under dated May 12, 2016 in connection with Application GB1519743.7.

* cited by examiner

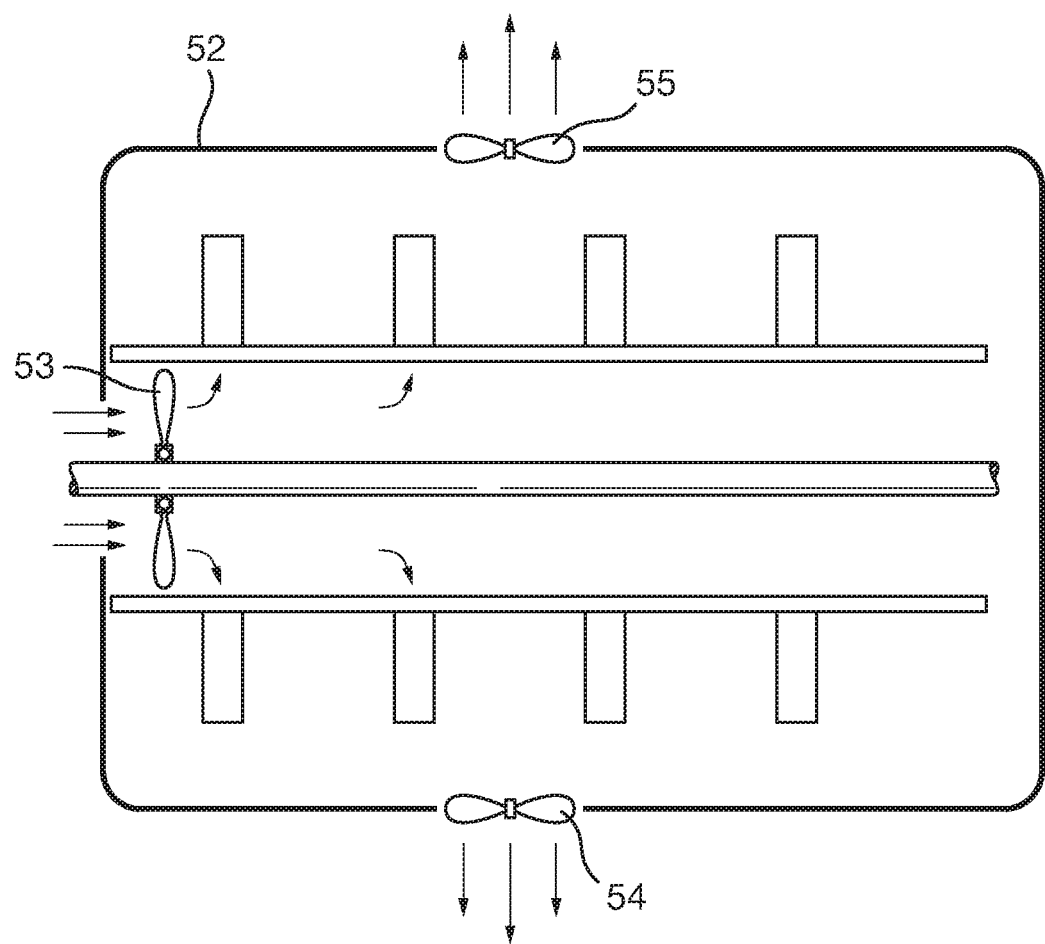

GENERATOR WITH SERIES STATORS, AND SERIES ROTORS SEPARATED BY ANNULAR COLLARS WITH COOLING VENTS

CROSS-REFERENCE TO RELATED APPLICATIONS

This application represents the national stage entry of PCT International Application No. PCT/GB2016/053498 filed Nov. 9, 2016, which claims priority to Great Britain Patent Application 1519743.7 filed Nov. 9, 2015, the contents of which are hereby incorporated herein by reference for all purposes.

The following invention relates to cooling means for low speed direct drive generators, and in particular, cooling means for the form of direct drive generator disclosed in my co-pending patent applications publication number GB 2 520 516 and application number GB 201508568.1.

Direct drive generators are commonly used for the conversion of wind energy to electricity in wind turbines. In the name of cost and efficiency, the current trend is for the use of ever larger machines, having for example generating capacities of up to eight megawatts (8 MW). The level of conversion efficiency expected of these generators is in the region of 95%. Thus $19/20$ths of the energy presented by the impeller of the wind turbine to the generator is to be converted to electricity and transmitted to the local grid, leaving $1/20$th to be dissipated as heat within the generator itself.

It is readily appreciated that in the case of an 8 MW generator, even at a conversion efficiency of 95%, this leaves $1/20$th of 8 MW, i.e. 400,000 watts, to be conveyed away from the windings of the stators of the generator. This presents a considerable challenge to generator manufacturers as well as to the designers of the nacelles in which they are housed. It is critically important that this heat is conveyed away evenly, to avoid the possibility of hot spots arising with consequent destruction of any part or parts of the rotor and/or stator of such generators.

In the generator of my aforementioned co-pending application no. GB 201508568.1, the rotating part of the generator comprises a series of in line annular magnet bearing rotors, spaced one from the other at their inner regions by intermediate annular collars and which sandwich a series of stationary annular coil stator plates in which are embodied the stator coils, each occupying the outer region space between two facing rotors. An air gap exists between the faces of the rotors and the faces of the stators sandwiched between them, one function of which is to ensure adequate mechanical clearance between the two. The rotors and collars are mechanically rigidly linked to one another and torque from the impeller of the wind turbine is communicated by mechanical means to this assembly.

The present invention provides a generator comprising: a series of spaced annular stators sandwiched between a series of rotors, the rotors each being separated by annular collars, the annular collars defining a central cavity; at least one cooling gas source for supplying gas to the central cavity; vents through the annular collars for providing a means of egress for the cooling gas from the central cavity radially outwards over the rotors and the annular stators.

According to an embodiment cooling gas (e.g. air) for such a form of generator is supplied under pressure by one or more sources to a central cavity within and as defined by the series of annular rotors, and vents are provided through the collars situated between the rotors such as to provide a means of egress of the cooling gas which is forced radially outwards from the collars over the rotors and the stators sandwiched between them, characterised in that the number and/or aperture size of the vents is so selected as to ensure a substantially even dispersal of cooling gas over any given pair of rotors and the stator sandwiched between them regardless of the spacial separation of the said pair of rotors and their respective sandwiched stator from the one or more sources of cooling gas.

Thus, by this arrangement, cooling gas passing through the vents in the collars separating the rotors is caused to be ventilated outwards past and over the surfaces of both the rotors and the stators, and the volume of gas so doing is kept substantially constant anywhere along the length of the series of rotors and stators. Owing to the rotation of the series of rotors relative to the stationary stators, jets of gas issuing from the vents in the collars in effect sweep spirally over the coils of the stators both in a radial and circumferential sense so optimising the cooling of the stator coils and the dissipation of heat.

In a preferred form, the vents are angled relative to a true radius of the rotors in such manner as both to assist the spiral passage of the gas over the stator coils and such that the equal and opposite reaction of the gas jets issuing therefrom at least assists the direction of rotation of the rotors.

For generators comprising a substantial series of rotors, for example six or more, in a preferred arrangement cooling gas is forced into the central cavity defined by the rotors from each end thereof. By this means, not only can the volume of cooling gas be doubled but also the increased pressure within the rotor cavity resulting from this arrangement is correspondingly raised to assist the egress of gas through the aforesaid vents. An even distribution over the more central rotors and stators is further facilitated by the cooling gas having less distance to reach them.

A method of construction for the generator of the aforesaid co-pending application is for one or more radial support members affixed to its rotors to extend inwardly towards housings carrying one or more central bearings mounted upon a central shaft. This enables the rotor assembly to rotate around the said central shaft.

According to an aspect of the invention, the sources used to propel gas into the central cavity comprises one or more fans, sharing this central shaft and caused to rotate by ancillary electric motors.

In an alternative arrangement, the radial support members may be permanently affixed to the said shaft, such that the rotors and shaft rotate together. The shaft is borne by external bearings. Again, cooling fans may share this shaft to propel gas into the central cavity.

For very large generators, where the effectiveness of gas cooling is utterly essential, according to an aspect of the invention—with the exception of gas inlet ports—the entire generator is substantially hermetically sealed within a container, and gas is extracted therefrom by one or more further cooling fan(s).

The invention will now be described with reference to the accompanying drawings in which:

FIG. 1 shows, in a cross-section, a direct drive generator embodying the gas cooling means of the invention;

FIGS. 2a and b show in more detail the air venting arrangements depicted in FIG. 1 in plan and in cross-section respectively;

FIG. 5 shows, in cross-section, a direct drive generator housed within a container with additional means for withdrawing cooling gas therefrom.

Figure 1:
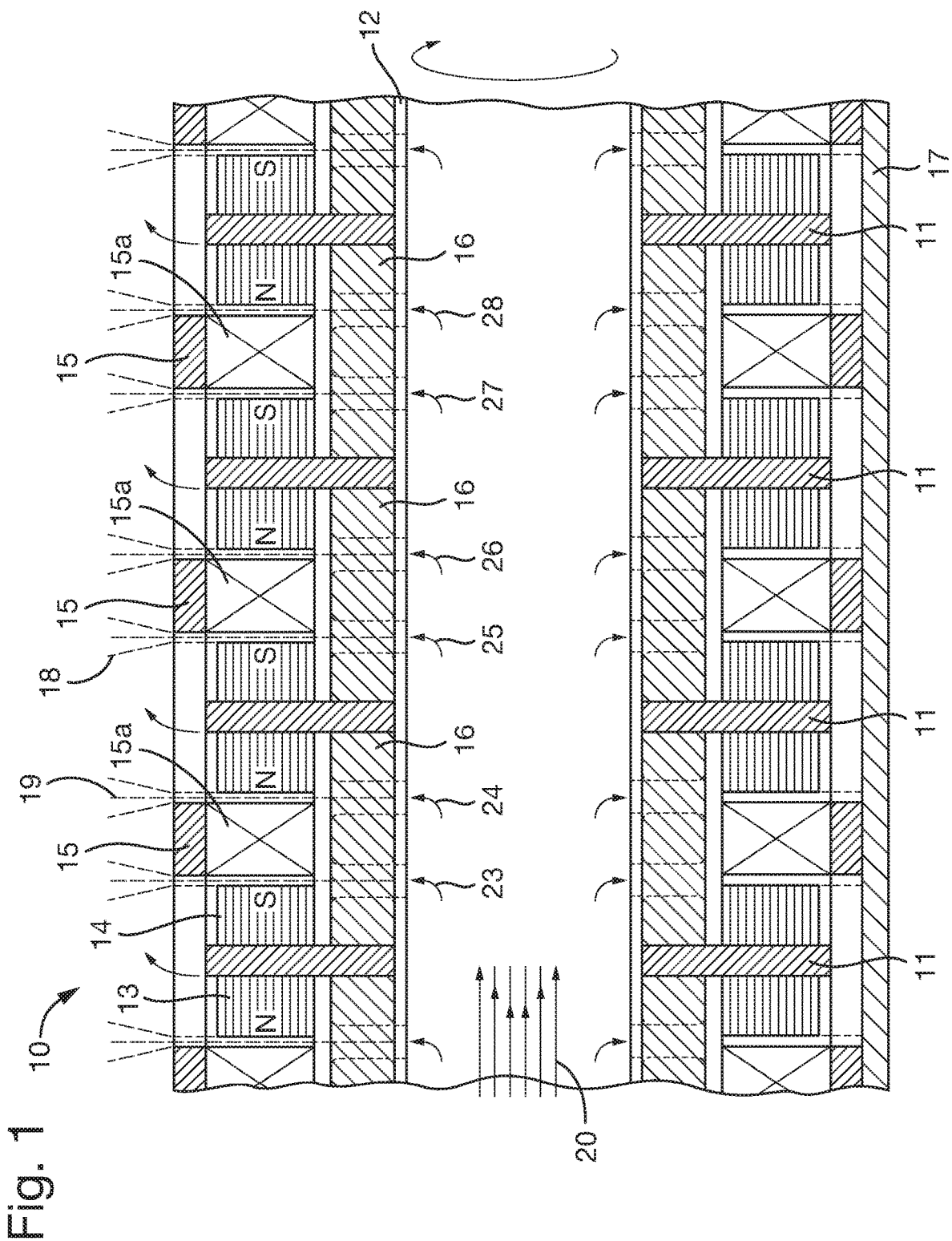

Referring to FIG. 1, a direct drive generator to which the present invention can be applied is designated generally at 10. The generator comprises a series of annular rotors 11, carried and mounted upon a central cylinder 12, for rotating relative to fixed stators 15 sandwiched between them. Mechanical means (not shown) is used to convey torque to the cylinder/rotor assembly to effect the said rotation relative to the stators 15. Each of the rotors 11 carries around its outer face an array of permanent magnets as shown at 13 and 14. Opposite poles face one another across the gap between rotors 11 as shown. The stators each carry around their peripheries an array of coils, as shown at 15a. Electricity is generated in the stator coils 15a as the changing lines of magnetic flux passing between facing magnets 13, 14 sweep past them.

For certain applications, for example the use of such a generator to convert wind energy to electricity, very substantial thermal losses can occur. By way of illustration, an eight megawatt generator operating at 95% conversion efficiency leaves 400,000 watts of heat to be dissipated within the stator coil 15a windings. This heat must be conveyed away systematically, in particular away from the stator coils 15a, to avoid hot spots arising and the consequent destruction of the said stator coils 15a.

A method of achieving this is now illustrated again with reference to FIG. 1.

Each of the rotors 11 is held in position relative to the rotors 11 on either side of it by intermediate annular collars, as shown at 16.

These rest against the radially inner region of the rotors 11. Draw bolts, not shown, passing longitudinally through the rotors 11 and collars 16 from end to end hold the whole assembly together. The collars 16 are coaxially mounted upon and carried by the central cylinder 12, in similar manner to the rotors 11. Cooling gas (e.g. air) is blown (e.g. pushed or sucked) into the central cylinder 12 as shown by the arrows at 20. The far end of the central cylinder 12 is blocked off (not shown) to prevent escape of the gas. Cooling of the rotors 11 and stators 15 is effected as follows.

Gas vents, provided radially through and circumferentially around the collars 16, are aligned during manufacture with orifices situated along the central cylinder 12. This provides a direct path for gas (e.g. under pressure) within the central cylinder 12 to egress from the central cylinder 12 and out into the gap past the faces of both the rotors 11 and stators 15, as shown by the small arrows in FIG. 1. The outlet of the vents in the radially outermost surface of the collars 11 are axially aligned with one or both axial ends of the stator coils 15a and/or one or both outwardly facing axial ends of the permanent magnets 13, 14. On account of the rotation of the rotors 11, this escaping gas is favourably distributed over the stator 15 surfaces. The gas eventually escapes from the gap between the stator 15 and rotor 11 surfaces as shown at 18 and 19.

This arrangement is satisfactory for generators comprising a relatively short series of pairs of rotors 11 and stators 15, for example three or under. For a longer series, gas pressure within the cylinder 12 naturally can tend to become curtailed both as a result of turbulence and its prior passage through preceding vents.

Figure 2A:
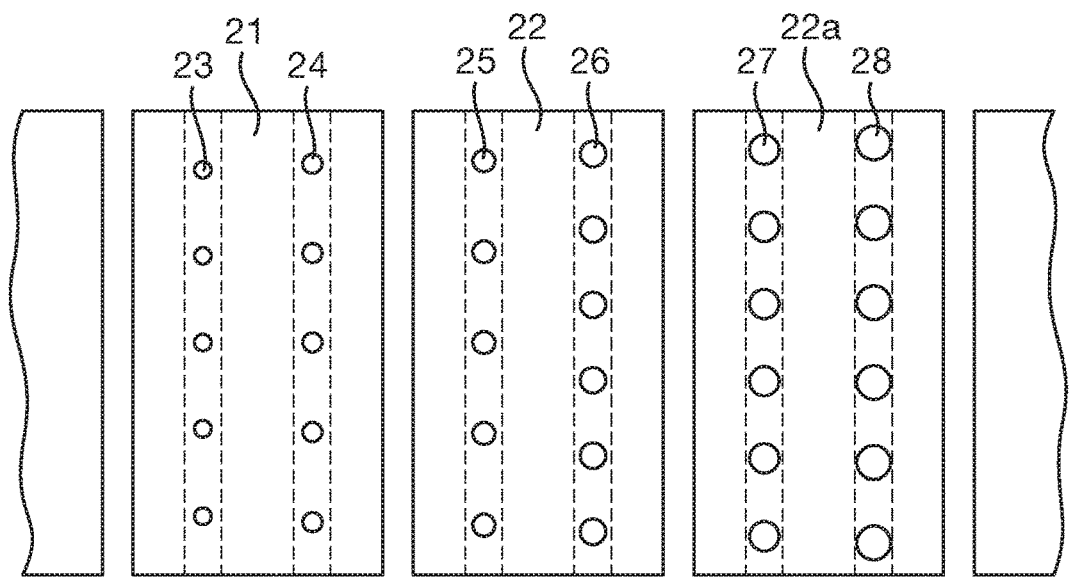

A method of overcoming this, in accordance with the present invention, is illustrated with reference to FIG. 2a for the case of gas being at elevated pressure within the central cylinder compared to atmospheric pressure. The annular collars shown at 16 in FIG. 1 and which separate the rotors 11, are shown again in plan view at 21, 22 and 22a. The rows of vents provided radially through and circumferentially around these collars are shown schematically at 23 to 28. The vents in the left hand side of the left hand collar, i.e. that portion which is nearest the source of the cooling gas 20, are of lesser diameter, and the diameter and/or number of vents is gradually increased, as again shown schematically, the further away they are from the source of the cooling gas to compensate for the aforesaid gradual curtailment in gas pressure. By this means, a substantially even distribution of cooling gas is realised over the rotor 11 surfaces and their sandwiched stators 15 along the whole series of each. In other words, the sum of cross-sectional areas of vents in a row of vents 23-28 increases the further from the source of cooling gas 20 the respective row of vents 23-28 is situated.

For the case where gas passes through the central cylinder 12 due to an under pressure being created in the central cylinder 12 (for example by fans 54, 55 described below), an even distribution of gas flow over rotor 11 surfaces might be achieved by a different distribution of number and/or aperture size of vents 23-28. For example, the number and/or aperture size would increase as distance from fans 54, 55 increases.

Figure 2B:
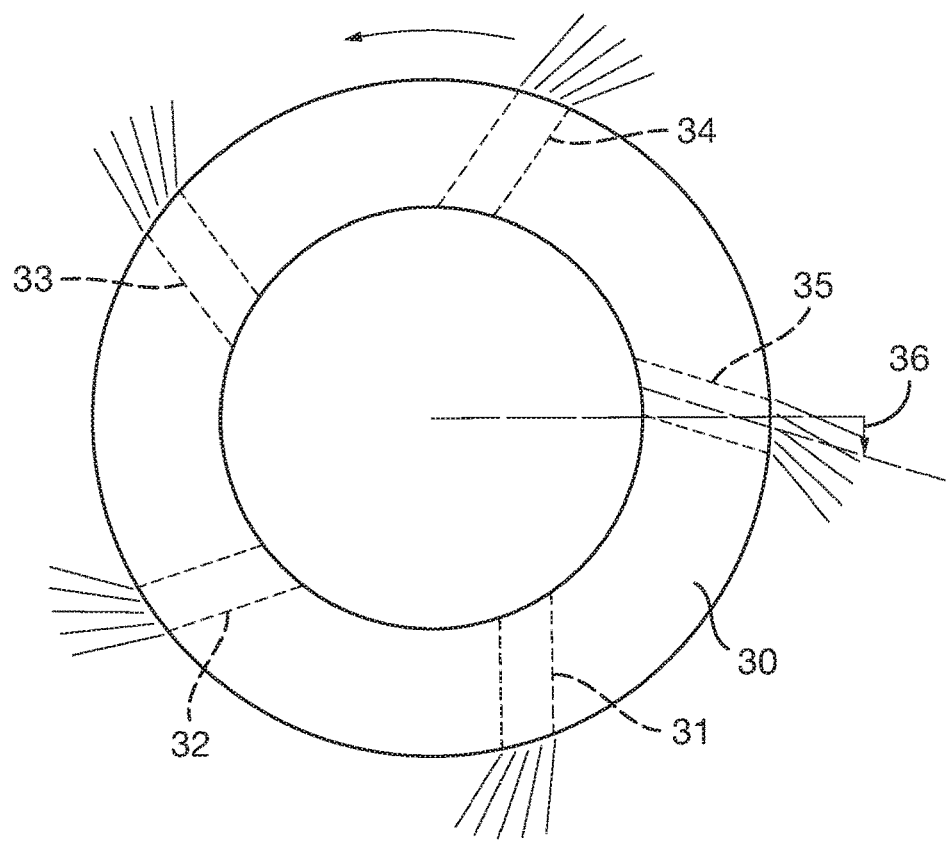

The specific geometry and design of the vents is now discussed with reference to FIG. 2b. A side view of one of the collars accommodating the vents is shown at 30, and the vents themselves at 31 to 35. It can be seen that the vents 31-35 are not in line with a true radius of the collar 30, but instead lie at an angle to the radius of the collar 30. The primary purpose is to cause the vented gas to egress from the collar 30 in a circumferential direction, and against the direction of rotation (shown by the top arrow in FIG. 2b), so biasing the motion of the cooling gas in a spiral motion past and over the faces of the stator coils 15a. A secondary purpose, albeit minor, is to assist the rotary motion of the collar 30 and thus the rotors 11 on either side of it. On account of the angle at which the gas escapes, a minor thrust vector 36 results thus to add, in the manner of the rotating steam sphere invented by Hero, to the forced rotary motion of the rotor series by the external and principal torque provider.

Figure 3:
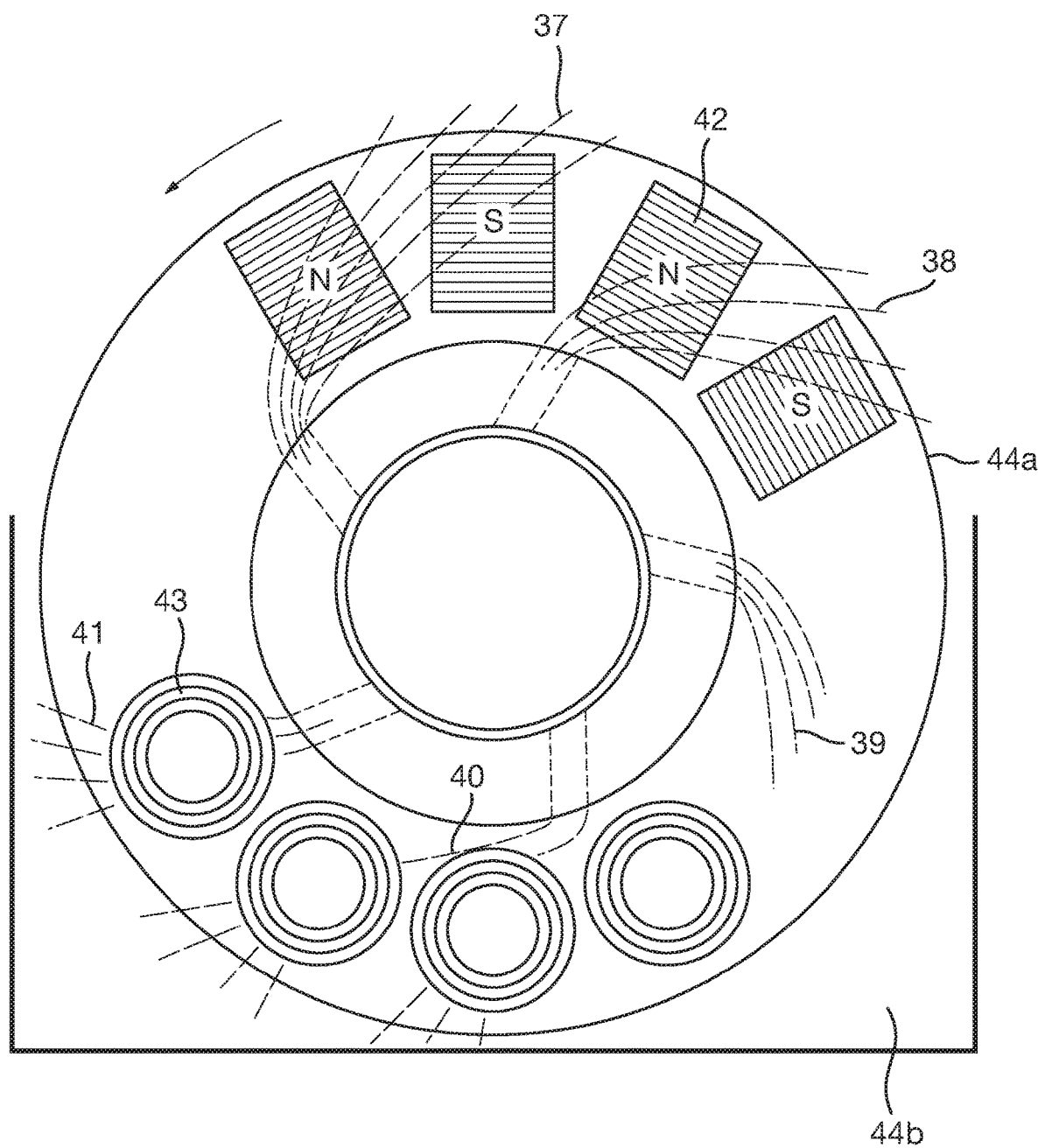
FIG. 3 shows, in cross-section, the passage of cooling gas over the rotors and stators of the generator.

A clearer indication of the spiralling cooling effect of FIG. 2 is shown at FIG. 3. The jets of gas issuing from the vents are shown at 37 to 41, and can be seen sweeping past the permanent magnets 42 as mounted on the rotor plate 44a and the coils 43 embedded in the stator plate, shown schematically at 44b.

Figure 4A:
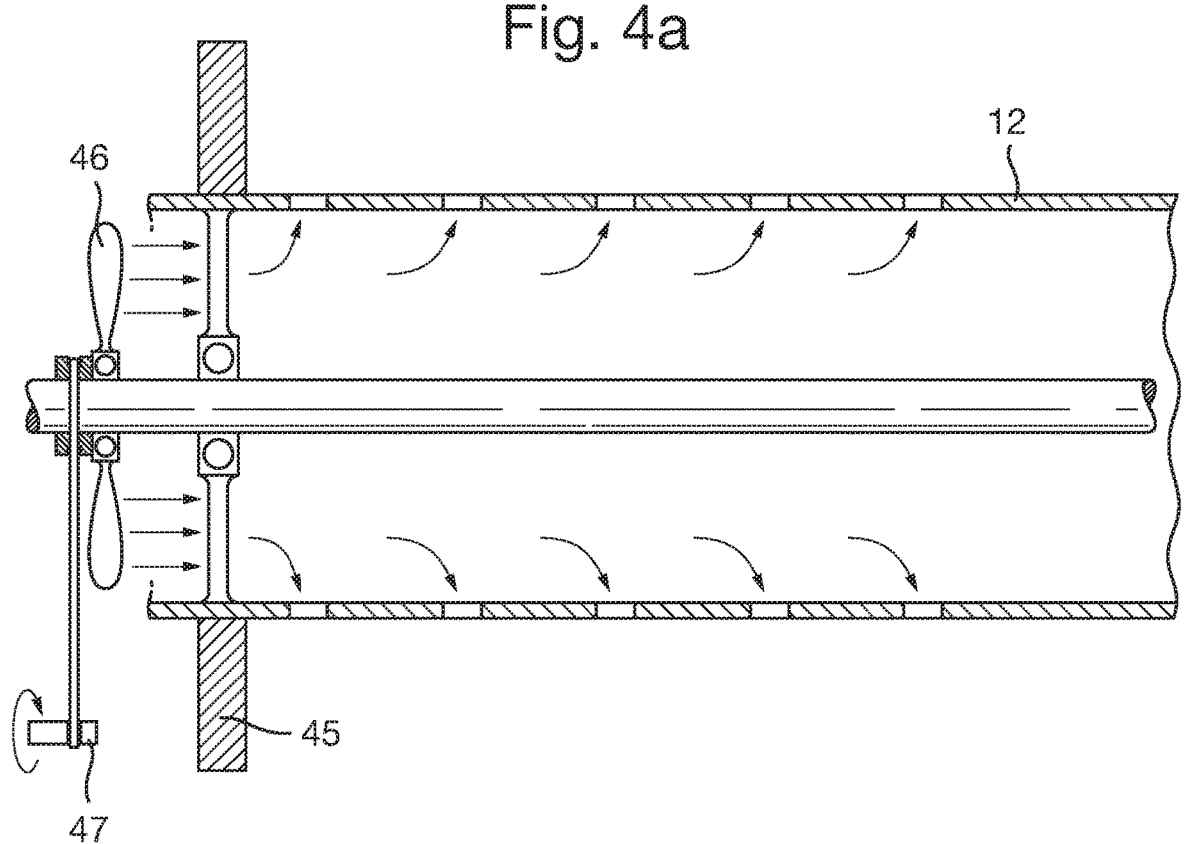
FIG. 4a shows, in cross-section, an arrangement for blowing cooling gas into the generator

Means for providing a stream of cooling gas to the generator 10 is now shown with reference to FIG. 4a. The cylinder 12 bearing the rotors—one of which is shown for reference at 45—is provided with a (pushing) fan 46, belt driven by an auxiliary electric motor 47. By this means, cooling gas is introduced (pushed) directly into the cavity formed by the cylinder 12.

Figure 4B:
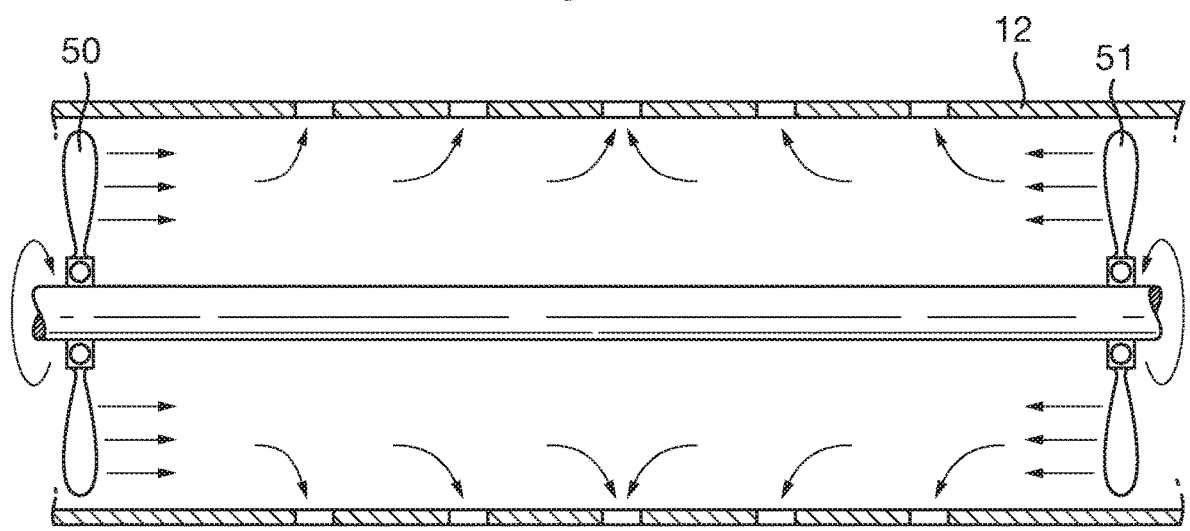
FIG. 4b shows a method of doubling the volume flow rate of gas.

Preferably, and especially for long series rotor and stator generators, cooling gas is introduced by the use of two (pushing) fans, positioned at each end of the cylinder 12, as shown at 50 and 51 in FIG. 4b. By this means, double the volume of gas is fed into the cylinder 12 for cooling purposes. The equal feeding of gas from both ends further facilitates the even distribution of gas though the cooling vents.

As a further means of enhancing the passage of cooling gas through the generator 10, the same may be enclosed in a container, as shown schematically at 52 in FIG. 5. Thus, the generator is mounted substantially hermetically within a housing. Gas is sucked and then propelled into the cylinder 12 by the (pushing) fan 53 (and optionally with one also at the opposite end as described with reference to FIG. 4b) and/or then, having passed over the rotors 11 and stators 15, is sucked out of the container 52 by the sucking fans 54 and 55 through one or more further orifices in the container. The fans 54, 55 can be positioned so as to achieve substantially equal cooling over each of the stators 15 either in combination with or without a variation in the number and/or aperture size of the vents 23-28 and 31-35 along the axial length of the apparatus. A single sucking fan 54, or a plurality of sucking fans 54, 55 may be provided in combination with or in the absence of pushing fans 50, 51. The action of the fans 54, 55 provides an overall enhanced gas flow and if both fans 50, 51 for pushing gas and fan 54, 55 for pulling gas are used an even further enhanced gas flow can be achieved.

In an embodiment, the cooling gas is air. The air may be air from the environment surrounding the generator.

Numerous variations will be apparent to those skilled in the art.

The invention claimed is:

1. A generator comprising: a series of spaced annular stators sandwiched between a series of rotors, the rotors each being separated by annular collars, the annular collars defining a central cavity; at least one cooling gas source for supplying gas to the central cavity; vents through the annular collars for providing a means of egress for the cooling gas from the central cavity radially outwards over the rotors and the annular stators; and a central shaft on which the rotors and annular collars are carried, wherein: the cooling gas source comprises one or more fans caused to rotate by an ancillary electric motor, and the one or more fans are mounted on the central shaft, wherein the diameter and/or number of vents through at least one of the annular collars is gradually increased the further away the at least one annular collar is from the cooling gas source.

2. The generator of claim 1, wherein the number and/or aperture size of the vents is so selected as to ensure a substantially even dispersal of cooling gas over any given pair of rotors and the stator sandwiched between them regardless of the spacial separation of the said pair of rotors and their respective sandwiched stator from the at least one cooling gas source.

3. The generator according to claim 1, wherein the vents are angled relative to a true radius of the collars to assist dispersal of the cooling gas in a spiral direction opposite to the direction of rotation of the collars, in use.

4. The generator according to claim 1, wherein an outlet of each vent in a radially outer surface of the respective annular collar is axially aligned with one or both axial ends of a respective annular stator and/or an axial end of a respective rotor.

5. The generator of claim 1, wherein the cooling gas source comprises two fans, positioned at each end of the central cavity, and configured to feed equal amounts of gas into the central cavity.

6. The generator of claim 1, further comprising one or more radial support members affixed to the rotors and extending inwardly towards the central shaft.

7. The generator of claim 6, wherein the radial support members extend inwardly from the rotors towards housings carrying one or more central bearings mounted upon the central shaft, enabling the rotor assembly to rotate around the central shaft.

8. The generator of claim 6, wherein the radial support members are permanently affixed to the central shaft, such that the rotors and shaft rotate together.

9. The generator according to claim 1, wherein the generator is mounted substantially hermetically within a housing, there being one or more orifices in the housing specifically to permit the intake of cooling gas, and one or more further orifices in the housing for allowing cooling gas to escape.

10. The generator of claim 9, wherein the at least one cooling gas source comprises means for facilitating the forced extraction of the cooling gas through the one or more further orifices.

11. The generator of claim 10, wherein the means for facilitating the forced extraction of the cooling gas comprises one or more fans for sucking gas out of the housing.

* * * * *